United States Patent Office 3,164,183
Patented Jan. 5, 1965

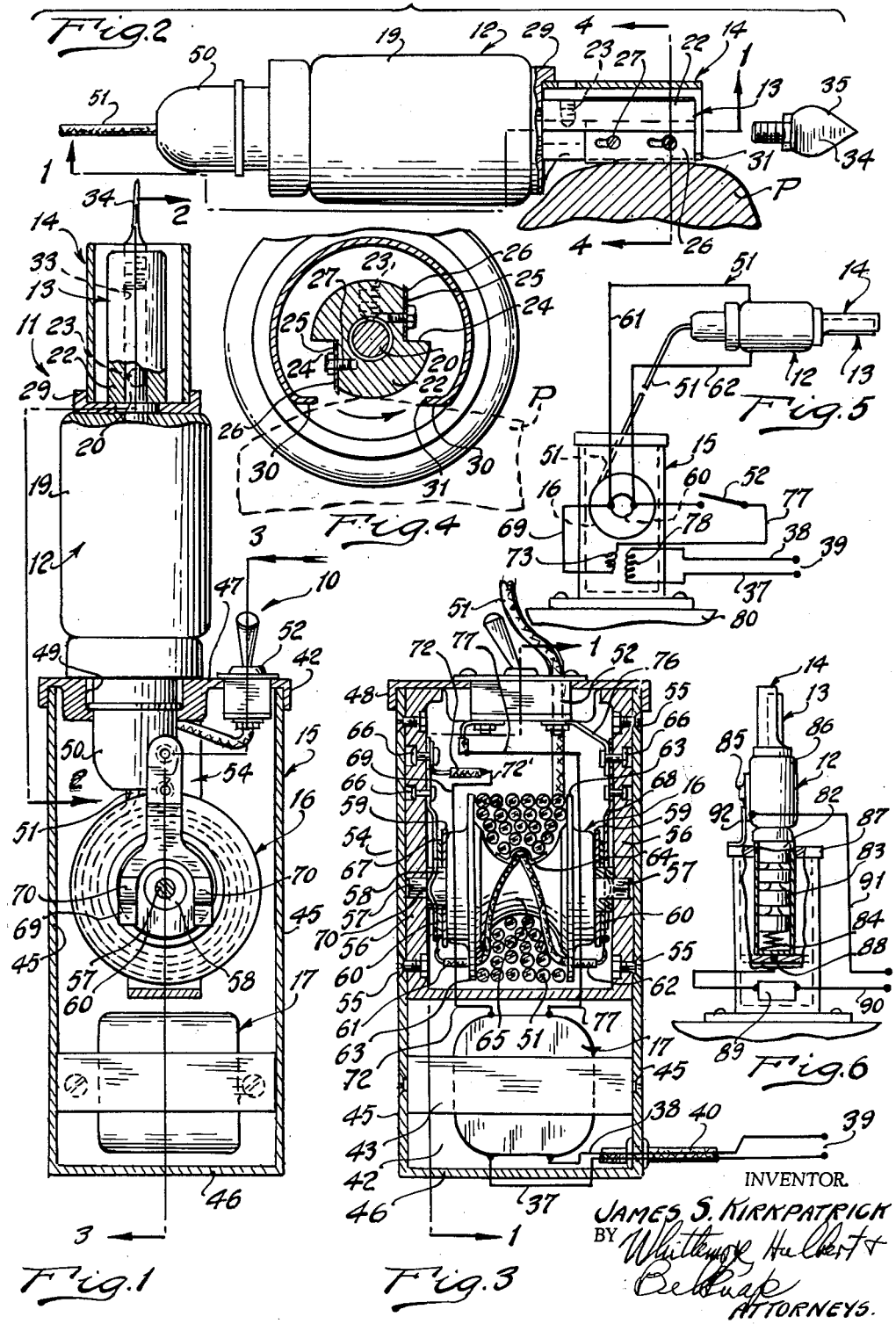

3,164,183
PARING AND CORING DEVICE
James S. Kirkpatrick, 5936 Oakman Blvd., Detroit, Mich.
Filed Feb. 8, 1963, Ser. No. 257,152
10 Claims. (Cl. 146—204)

The present invention relates to improvements in a kitchen appliance and, more particularly, to a motorized implement for the paring or abrading of vegetables, fruits and like edible objects to remove the skin therefrom.

It is an object of the invention to provide a kitchen appliance or implement for this purpose, as well as for other purposes which may arise in the kitchen and elsewhere to which the appliance may be suited by reason of its operating characteristics; which appliance is a portable one featuring a small electrical motor, to the output shaft of which a cutter is fixedly applied for rotation on an axis coaxial with the shaft. Such cutter is constituted by a generally cylindrical body having one or more cutting or paring blades affixed thereto which are elongated in a direction parallel to the shaft and body axis, being preferably set into recesses in the cylindrical periphery of the cutter body and fixedly secured therein so as to project slightly beyond the rounded peripheral surface of the cutter body.

Thus, upon energization of the motor from an appropriately stepped down electrical circuit, and through extension cord means to be described electrically connecting the motor through a transformer to an appropriate domestic voltage source, the cutter blading is rapidly rotated and, as engaged with the skin of a potato or the covering of some other vegetable or fruit held adjacent the periphery of the cutter body, will very rapidly and efficiently pare the object in question.

Furthermore, in associated with a motorized cutter of the character described, the invention contemplates the provision of a suitable safety shield or shroud carried by the housing of the motor and projecting endwise of the latter in partially surrounding relation to the cutter body and its blade or blades, being radially spaced outwardly of the latter. As herein illustrated, this shield extends substantially more than 180° around the axis of the cutter, and sufficiently to substantially house the latter and its blading within the shield. As thus disposed, the shield provides an axially elongated opening at one radial side of the cutter body, through which the cutter blading sweeps an arcuate path in the paring operation; and in accordance with the invention the side-to-side width of this axially extending opening is only sufficient to permit the desired paring, abrading or cutting engagement of the blades with the object being operated on.

That is, it is contemplated that, as the appliance is held in one hand and the object in the other, and the two moved longitudinally relative to one another, the area of paring engagement will be limited in dimension, the object engaging the side edges of the parts of the shield which define the opening in question, whereby to limit the extent to which the object may be moved radially inwardly against the cutter body, hence to limit the depth of the paring or abrasive cut performed by the blading on said object. At the same time, the rapidly rotating cutter body and blading are masked or shielded about the major portion of the path of the blades as a safety provision against possible injury to the hand of the user.

In further accordance with the invention, the shield is open at its opposite ends, one of which extends past the extreme outer end of the cutters, and is releasably attached to the motor housing to permit its ready removal for the flushing out or similar disposal of particles of skin which may be thrown out by the cutters in the rotary cutting or paring action; as well as the ready cleaning of the cutter itself.

Still further in accordance with the invention, it is contemplated that the blade-carrying cutter body of the appliance may be equipped with a supplementary cutting tool projecting axially endwise thereof for the gouging out, for example, of potato eyes, the sockets of tomato stems, etc.

A still further object of the invention is to provide a kitchen appliance of the character described which, as indicated above, is connected to a step-down transformer, the latter preferably fixedly mounted within an attractive-appearing stationary case, through the agency of an electrical connector or cable wound on an appropriate spring-biased, ratchet-type reel or spool, thus enabling the appliance to be used at any desired distance from the case, limited of course by the length of the cable mounted on the spool.

In accordance with this object, the electrical connector or cable is energized from the transformer under a stepped down voltage through the agency of slip rings at opposite ends of the spool to which terminals of the cable are electrically connected; and suitable electrically conductive arms bridge the spool shaft at these ends for conducting engagement with the slip rings in question. Such arms are in turn electrically connected to the secondary winding of the transformer through appropriate conductor means, including a manually operable switch carried at a convenient point on the transformer case, which also internally mounts the cable take-up spool.

Another object of the invention is to provide a combination of the motor driven cutter implement and an appropriate fixedly mounted casing which houses the electrical conductor or cord as well as the transformer referred to above, the case also being provided with an appropriate upper socket to receive and support the cutter and motor unit with the cord or conductor taken up on the internal spool of the case.

In another embodiment, the invention affords a battery type appliance or implement having cutter features as described above, but driven by battery power; and it is in contemplation of the invention that in this instance the case which receives the implement proper is wired to permit overnight recharging of the battery of the appliance.

The foregoing as well as other objects will become more apparent as this description proceeds, especially when considered in connection with the accompanying drawing illustrating preferred embodiments of the invention, wherein:

FIG. 1 is a view of the appliance of the invention in upright elevation, being partially broken away and in cross section along line 1—1 of FIGS. 2 and 3;

FIG. 2 is a side elevational view, partially broken away and in section along line 2—2 of FIG. 1, illustrating some features of the cutter structure and the manner in which the appliance is used in paring an object, such as a potato; this view also illustrating an auxiliary or supplementary gouging or boring tool which may be employed, as mounted on the end of the cutter body;

FIG. 3 is a view in vertical section on broken line 3—3 of FIG. 1, showing internal features of the conductor or cord take-up spool, and provisions for electrically energizing such cord regardless of the distance at which the appliance is operated from the fixed case housing the spool;

FIG. 4 is a view in vertical cross section along line 4—4 of FIG. 2, showing further structural features of the cutter of the appliance, as well as the manner in which it is manipulated in the paring of an object;

FIG. 5 is a schematic view generally indicating the wiring of the implement; and FIG. 6 is a schematic view, partially broken away and in upright section, illustrating a battery operated adaptation or version of the appliance.

Generally considered, the appliance of the present invention, one version of which is illustrated in FIGS. 1 through 5, being generally designated 10, comprises a motorized paring or abrading tool component, generally designated 11, including a suitably rated small electric motor 12, a cutter 13 direct driven by motor 12 and a protective shield 14; and a fixed mounting case or casing, generally designated 15, which internally houses a spring-biased ratchet-type cord or cable take-up reel 16, as well as an electrical step-down transformer 17. These basic components of the appliance will be described in the approximate order of their mention above.

The motor 12 may be a standard one of, say, 1/100 horsepower rating, operated at 7000 r.p.m. under energization from transformer 17 at 24 volts and .63 ampere. Stator and rotor parts (not shown) of the motor 12 are housed in a known manner in a cylindrical casing or housing 19, from which the shaft 20 of the motor projects endwise; and it is to be understood that the size and weight of the motor and associated portable parts shall be such as to enable their easy and comfortable handling by a housewife in use.

The cutter 13 comprises a generally cylindrical, tubular body 22 which has a relatively close tolerance telescoping fit over the end of shaft 20, as shown in FIG. 1, and is secured to the shaft to be driven thereby by means of a set screw 23. As best shown in FIGS. 2 and 4, the periphery of the cutter body 22 is formed to provide a pair of diametrically opposed recesses 24 extending axially of the body, these recesses being defined by generally radial walls at 90° to one another, each recess including a wall 25 against which an elongated cutter blade 26 is releasably clamped by a pair of screws 27 threaded into the wall of the cutter body 22. The blades 26 may typically be conventional shaving blades of a known type having apertures to receive the screws 27. As thus mounted in the cutter body recesses 24, each blade 26 projects radially a slight distance past the otherwise cylindrical periphery of the body 22, in a position to pare the surface of, for example, a potato P as the latter is held against the shield 14 and/or the cutter body 22.

The shield 14 is of generally cylindrical, tubular or sleeve-like outline, and of a diameter substantially in excess of the cutter body 22, being disposed concentrically of the axis of the latter. Shield 14 is fixedly but removably secured to the motor housing 19 in this relation to the cutter, as by telescoping the inner end of the shield frictionally into a flanged washer extension 29 interposed between the shield and housing of the motor and fixed to said housing. This permits the shield to be readily withdrawn for the cleaning of it and the cutter 13, when required. Axially outwardly of its telescoped engagement in the washer extension 29, the shield 14 has its wall cut away along a theoretical chord line and, as shown in FIG. 4, the cut away edges of the shield are brought inwardly toward one another at 30, thereby defining an axially extending opening 31 in shield 14 of a length at least sufficient to expose the blades 26 for paring engagement with an object, such as the potato P.

This formation of the shield 14 at the facing edge portions permits the pared object to be engaged against the inturned shield portions 30, yet have its rounded surface extending sufficiently into the opening 31 (FIG. 4) to be cut or scraped by the blades 26. Yet, in the case of an object having a sharper degree of curvature than shown in FIG. 4, its engagement with the cylindrical surface of cutter body 22 will similarly limit the depth of the cut. In either case, it is impossible for the user's hand, with any reasonable degree of care, to be exposed in the opening 31 for possible injury; and the axial length of the shield 14 is such that it overhangs lengthwise at its end the cutter body 22 and blades 26 carried by the latter.

As an additional refinement, the outer end of the bore 33 of the tubular body 22 may be threaded to removably receive a special end gouging tool or cutter 34 (FIGS. 1 and 2) characterized by outwardly tapering cutting edges 35. With the cutter 34 in place as illustrated in FIG. 1, the appliance 10 is adapted for removal of potato eyes, for coring tomatoes, apples and the like.

The motor 12 may optionally be an alternating current type or a direct current type having built-in provisions (not shown) enabling it to be energized through transformer 17 from the usual 100 volt A.C. domestic wall plug and socket connection, represented in FIGS. 3 and 5 by the conductors 37, 38 leading from such a source 39 to the terminals of the primary winding of transformer 17. An electrical cord or cable 40 of which these conductors are parts is led into a side wall of the rectangular case 15 adjacent the bottom thereof and is connected to the primary winding of the transformer 17, which is suitably supported fixedly in a lower compartment 42 of the case 15, as by means of a rigid bracket unit 43 in that compartment.

The casing or case 15 is shown as being of a square cross sectional outline of its walls 45, closed at its bottom by an integral base panel 46 and open at its top. A special closure plate 47 is applied over the casing top, such top panel 47 having an integral depending four sided flange 48 telescoped downwardly over the casing walls; and the closure plate 47 is provided with a downwardly extending well or socket 49 into which an electrical connector fitting 50 carried at the bottom of motor housing 19 is adapted to be placed, as shown in FIG. 1. Thus the motorized tool including motor 12, cutter 13 and shield 14 is supported on case 15 when not in use; with its electrical supply cord or cable 51 (FIGS. 1, 3 and 5) wound about the spool 16. FIG. 5 schematically shows the electrical circuitry, in addition to physical components, by which the motor 12 is electrically energized, including take-up spool, slip ring provisions to be described.

In addition to supporting the tool in its position of non-use, the closure plate 47 is provided with an aperture receiving a standard "on-off" toggle switch 52. This switch is wired, along with other slip ring means and connectors, in the circuit of the secondary winding of transformer 17 in a manner to be described.

The casing 15 internally receives a U-shaped stirrup of electrically non-conducting material which is designated by the reference numeral 54, such stirrup being rigidly secured to opposed walls 45 of the case 15 by screws 55. The opposed upright legs 56 of the insulating stirrup 54 fixedly receive the opposite ends of an elongated fixed stem or shaft 57 upon which the take-up spool 16 is supported for rotation.

This spool is a conventional spring-biased ratchet type enabling the electrical cord 51 to be brought out any desired distance limited by its length only, and then to prevent retrograde travel of the cord in the opposite direction until a slight releasing pull is exhibited on the cord. Structural details of the spool 16 are not shown, since the article is a commercially available one and, per se, constitutes no part of the present invention. It is, however, necessary to electrically insulate the spool 16 from certain slip rings and other conducting components to be described.

To this end, the projecting trunnion ends of the spool stem 57 (with the spool 16 appropriately connected to the latter in known manner) have insulating sleeves 58 applied thereto outwardly of the spool ends; and the latter each have an insulating washer or apertured disc 59 mounted thereon in fixed relation thereto for rotation therewith, such discs surrounding the insulating sleeves 58. A disc-like slip ring 60 is fixedly secured to each insulating washer 59 axialy outwardly of the latter, hence rotatable with the spool 16; and each slip ring 16 is electrically connected to one of two conductors 61, 62 of the cord 51 wound on spool 16. These conductors 61, 62 are brought axially inwardly in opposite directions through the radial end flanges 63 of spool 16, being then secured appropriately, as by a clip 64, to the axial center of the barrel portion 65 of spool 16. From this point of securement the conductors 61, 62, as assembled in the two-conductor cord or cable 51, are wound about the spool 16, the cord 51 passing upwardly to its connection to the electrical fitting 50 of motor 12 and, as the appliance is placed in use, through the socket or well 49 of the top closure plate 47 of case 15.

Each of the upright legs 56 of the stirrup member 54 has secured thereto, as by means of a pair of vertically spaced rivets 66, a downwardly extending electrical contact arm, such arms being respectively designated 67 and 68. At their lower ends, contact arms 67, 68 are forked at 69 to straddle opposite ends of the spool mounting stem 57 and have formations 70 which, in being received between the stirrup legs 56 and slip discs 60, make a firm sliding electrical contact with the latter. Thus, in any rotative position of the spool 16, a good electrical contact is made from the fixed contact arms 67, 68 to the slip discs or rings 60, thence to the respective conductors 61, 62 of electrical cord 51.

At its upper end, the forked contact arm 67 carries a terminal 72, from which a lead 72' connects to one terminal of the secondary winding 73 (FIG. 5) of the transformer 17. The other forked contact arm 68 connects electrically through a conducting strap 76 with one terminal of the toggle switch 52; and the second terminal of this switch is electrically connected through a lead or conductor 77 with a terminal of the secondary winding of transformer 17.

Thus, with the supply conductor 40 (FIG. 3) electrically connected to the A.C. source 39, and with toggle switch 52 in closed condition, an electrical circuit at stepped down voltage is completed from one terminal of the secondary transformer winding through the lead 72', the connector 72, the contact arm 67, one of the slip discs or rings 60, the conductor 61 of the electrical cord 52, the motor 12, the return conductor 62 of cord 51, the second slip disc 60, the contact arm 68, the connector strap 76, the switch 52 and the lead 77 to the second terminal of the transformer secondary winding 73. The primary winding of transformer 17 is designated 78 in FIG. 5 of the drawing.

It is contemplated that the mounting case 15 of the appliance be suitably supported fixedly on a stationary base 80, as indicated in FIG. 5. Such case, the spool mounting stirrup 54 which is a part thereof, the cutter shield 14 and the motor housing 12 will preferably be fabricated of a suitable relatively rigid, moldable plastic, for desired lightness in weight as well as low cost of production and desired insulating properties.

It is apparent that the invention affords an improved kitchen appliance or implement which is extremely compact and which enables the paring, abrading or cutting of fruits, vegetables, or the like in a moment's time. This is to be compared to its great advantage with the same operation as performed by existing kitchen hardware. The implement is entirely safe for use, with an exercise of the slightest reasonable care on the part of the user.

FIG. 6 of the drawing illustrates a modified adaptation of the invention in an inexpensive battery-energized unit. Here, the motor 12, as equipped with a cutter 13 and shield 14 of the type described above, is mounted coaxially endwise to a tubular, flashlight-type casing 82 containing a series of rechargeable cells 83 spring urged for electrical contact with one another by means of a coiled end spring 84, which also completes an electrical contact between the lowermost cell 83 and the end wall of casing 82. The motor circuit is controlled by an "on"-"off" finger switch 85 on the motor housing 86.

When it is desired to recharge the battery periodically, the casing 82 is inserted within the well of a suitable upright casing 87, making contact with a bottom electrical terminal 88 within the latter. As schematically shown in FIG. 6, a battery recharging unit 89 is wired between the terminal 88 and a conductor 90 leading to a voltage source terminal; and a further conductor 91 from the same source connects to a contact 92 on the top of casing 87, with which contact 92 the motor housing 86 has engagement to complete a battery-recharging circuit when the appliance is in place on casing 87. Suitable "on"-"off" switch means (not shown) may be employed to control the circuit.

As indicated above, FIG. 6 is entirely schematic in its showing of the recharger 89, which may be a known type mounted within or without the casing 87 in a manner which will suggest itself to those skilled in the art. When the unit is being recharged the switch 85 is of course in "off" position.

While the cutter unit 13 is shown and described as comprising a body 22 having separate blades 26 fixedly secured thereto, it is to be understood that this cutter unit might well be an integral, one-part one; and it is further to be understood that, in a structure having separate blades as shown, these could readily be made adjustable in the radial direction to vary their outer overhang of the body 22.

Furthermore, while the transformer has been employed in the embodiment of FIGS. 1-5 to step down the voltage and thus meet underwriter specifications for the particular type of implement in question, or the latter has been shown in FIG. 6 as a battery powered one, it is to be understood that in uses which permit thereof, the motor of the implement may be direct powered from a standard 110 or 220 volt source.

The drawing and the foregoing specification constitute a description of the improved kitchen appliance in such full, clear, concise and exact terms as to enable any person skilled in the art to practice the invention, the scope of which is indicated by the appended claims.

What I claim as my invention is:

1. An appliance of the type described, comprising a tool including a manually portable rotative cutter and cutter drive motor unit, an elongated electrical conductor connected to said unit to electrically energize the same, a casing having a spool therein about which said conductor is wound and an opening at which said unit is removably supported and through which said conductor may be drawn from the spool when the tool is remote from said casing, and means to energize said conductor, comprising electrical slip ring means rotatable with said spool and electrically connected to said conductor, and electrical connector means connecting said slip ring means with a voltage source.

2. An appliance of the type described, comprising a tool including a manually portable rotative cutter and cutter drive motor unit, an elongated electrical conductor connected to said unit to electrically energize the same, a casing having a spool therein about which said conductor is wound and an opening at which said unit is removably supported and through which said conductor may be drawn from the spool when the tool is remote from said casing, and means to energize said conductor, comprising electrical slip ring means rotatable with said spool and electrically connected to said conductor, a transformer within said casing, and electrical connector means connecting said slip ring means with the secondary winding of said transformer.

3. A kitchen paring or like cutting appliance, comprising a rotary cutter provided with a blade projecting outwardly in a plane generally paralleling a plane including the axis of the cutter, an electric motor having a housing and a drive shaft projecting from said housing coaxial with the cutter axis and drivingly connected to the cutter, means to energize said motor, said motor housing having an end extension surrounding the projecting shaft, and a shield fixedly but removably mounted in axially telescoped relation to said motor housing extension and concentrically of said cutter in radially outwardly spaced relation to said blade, said shield providing an opening through which said blade is adapted to pass in the rotative movement of said cutter for cutting engagement of said blade with an object supported adjacent said shield opening.

4. A kitchen paring or like cutting appliance, comprising a rotary cutter provided with a blade projecting outwardly in a plane generally paralleling a plane including the axis of the cutter, an electric motor having a housing and a drive shaft projecting from said housing coaxial with the cutter axis and drivingly connected to the cutter, means to energize said motor, said motor housing having an end extension surrounding the projecting shaft, and a shield fixedly but removably mounted in axially telescoped relation to said motor housing extension and concentrically of said cutter in radially outwardly spaced relation to said blade, said shield providing an opening through which said blade is adapted to pass in the rotative movement of said cutter for cutting engagement of said blade with an object supported adjacent said shield opening, said motor energizing means comprising an elongatd electrical conductor electrically connected to said motor, the appliance further comprising a casing provided with an internal spool about which said conductor is wound for extension externally of the casing when the appliance is in use, and slip ring means in said casing operatively connected electrically with said spool an electrical conductor and adapted to be electrically connected to an external voltage source to energize said conductor and motor.

5. A kitchen paring or like cutting appliance, comprising a rotary cutter provided with a blade projecting outwardly in a plane generally paralleling a plane including the axis of the cutter, an electric motor having a housing and a drive shaft projecting from said housing coaxial with the cutter axis and drivingly connected to the cutter, means to energize said motor, said motor housing having an end extension surrounding the projecting shaft, and a shield fixedly but removably mounted in axially telescoped relation to said motor housing extension and concentrically of said cutter in radially outwardly spaced relation to said blade, said shield providing an opening through which said blade is adapted to pass in the rotative movement of said cutter for cutting engagement of said blade with an object supported adjacent said shield opening, the appliance further comprising a casing having an opening to receive and support said cutter and motor when not in use.

6. A kitchen paring or like cutting appliance, comprising a rotary cutter provided with a blade projecting outwardly in a plane generally paralleling a plane including the axis of the cutter, an electric motor having a housing and a drive shaft projecting from said housing coaxial with the cutter axis and drivingly connected to the cutter, means to energize said motor, said motor housing having an end extension surrounding the projecting shaft, and a shield fixedly but removably mounted in axially telescoped relation to said motor housing extension and concentrically of said cutter in radially outwardly spaced relation to said blade, said shield providing an opening through which said blade is adapted to pass in the rotative movement of said cutter for cutting engagement of said blade with an object supported adjacent said shield opening, said motor energizing means comprising an elongated electrical conductor electrically connected to said motor, the appliance further comprising a casing having an opening to receive and support said cutter and motor when not in use, and through which said electrical conductor is adapted to be drawn, said casing being provided with an internal spool about which said conductor is wound for extension externally of the casing when the appliance is in use.

7. A kitchen paring or like cutting appliance, comprising a rotary cutter provided with a blade projecting outwardly in a plane generally paralleling a plane including the axis of the cutter, an electric motor having a housing and a drive shaft projecting from said housing coaxial with the cutter axis and drivingly connected to the cutter, means to energize said motor, said motor housing having an end extension surrounding the projecting shaft, and a shield fixedly but removably mounted in axially telescoped relation to said motor housing extension and concentrically of said cutter in radially outwardly spaced relation to said blade, said shield providing an opening through which said blade is adapted to pass in the rotative movement of said cutter for cutting engagement of said blade with an object supported adjacent said shield opening, said motor energizing means comprising an elongated electrical conductor electrically connected to said motor, the appliance further comprising a casing having an opening to receive said cutter and motor when not in use, and through which said electrical conductor is adapted to be drawn, said casing being provided with an internal spool about which said conductor is wound for extension externally of the casing when the appliance is in use, and slip ring means in said casing electrically connected to said spool and conductor and adapted to be electrically connected to an external voltage source for the energization of said conductor and motor.

8. A kitchen paring or like cutting appliance, comprising a rotary cutter provided with a blade projecting outwardly in a plane generally paralleling a plane including the axis of the cutter, an electric motor having a housing and a drive shaft projecting from said housing coaxial with the cutter axis and drivingly connected to the cutter, means to energize said motor, said motor housing having an end extension surrounding the projecting shaft, and a shield fixedly but removably mounted in axially telescoped relation to said motor housing extension and concentrically of said cutter in radially outwardly spaced relation to said blade, said shield providing an opening through which said blade is adapted to pass in the rotative movement of said cutter for cutting engagement of said blade with an object supported adjacent said shield opening, the appliance further comprising a casing having an opening to receive said cutter and motor when not in use, said motor energizing means comprising a battery unit electrically connected to said motor, and means in said casing engageable with said battery unit, as supported by said casing, to recharge said battery unit when the appliance is not in use.

9. A kitchen appliance comprising a rotary cutter body having a generally cylindrical peripheral surface provided with at least one flat walled recess exposed outwardly at 90° from the flat wall thereof and extending in a plane generally paralleling a plane including the axis of the cutter body along a substantial axial length of said body, a cutter blade fixedly secured flatwise against said flat wall of said recess and projecting in said first named plane outwardly of said body, a motor housing having an end extension, an electric motor in said housing having a drive shaft coaxial with said drivingly connected to said cutter body, and a shield fixedly but removably supported coaxially in telescoped relation to said motor housing extension and disposed concentrically of said cutter body in radially outwardly spaced relation to said blade.

10. A kitchen appliance comprising a rotary cutter body having a generally cylindrical peripheral surface provided with at least one flat walled recess exposed outwardly at 90° from the flat wall thereof and extending in a plane generally paralleling a plane including the axis of the cutter body along a substantial axial length of said body, a cutter blade fixedly secured flatwise against said flat wall of said recess and projecting in said first named plane outwardly of said body, a motor housing having an end extension, an electric motor in said housing having a drive shaft coaxial with and drivingly connected to said cutter body, and a shield fixedly but removably supported coaxially in telescoped relation to said motor housing extension and disposed concentrically of said cutter body in radially outwardly spaced relation to said blade, said cutter body having means to mount a cutter thereon to project coaxially of the outer end of said body.

References Cited by the Examiner
UNITED STATES PATENTS

| | | | |
|---|---|---|---|
| 1,591,860 | 7/26 | McGinnis | 30—276 |
| 2,407,737 | 9/46 | Erasmus. | |
| 2,835,919 | 5/58 | Colburn et al. | 17—5 |
| 2,926,865 | 3/60 | Humphreys | 242—107.13 |
| 3,026,612 | 3/62 | Szczepanski | 30—276 XR |

FOREIGN PATENTS 524,799   8/40   Great Britain.

J. SPENCER OVERHOLSER, *Primary Examiner.*